US006385249B1

(12) United States Patent
Kondo et al.

(10) Patent No.: US 6,385,249 B1
(45) Date of Patent: May 7, 2002

(54) DATA CONVERTING APPARATUS, METHOD THEREOF, AND RECORDING MEDIUM

(75) Inventors: Tetsujiro Kondo, Tokyo; Kenji Takahashi, Kanagawa; Naoki Kobayashi, Kanagawa; Yoshinori Watanabe, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/572,260

(22) Filed: May 17, 2000

Related U.S. Application Data

(63) Continuation of application No. PCT/JP99/05084, filed on Sep. 17, 1999.

(30) Foreign Application Priority Data

Sep. 18, 1998 (JP) .......................................... 10-264194

(51) Int. Cl.⁷ ................................................ H04N 7/12
(52) U.S. Cl. ................................. 375/240.27; 382/238
(58) Field of Search ...................... 375/240.12, 240.16, 375/240.24, 240.26, 240.27; 382/232, 236, 238, 239; 348/410.1, 415.1, 416.1, 444, 448, 458, 615, 607, 618, 581

(56) References Cited

U.S. PATENT DOCUMENTS

| 5,912,708 A | 6/1999 | Kondo et al. ............ 348/415.1 |
| 5,940,539 A | * 8/1999 | Kondo et al. ................ 382/236 |
| 6,233,019 B1 | * 5/2001 | Kondo et al. ................ 348/458 |

FOREIGN PATENT DOCUMENTS

| EP | 0 820 195 A2 | 1/1998 | ............ H04N/7/26 |
| EP | 0 820 198 A2 | 1/1998 | ............ H04N/7/26 |
| EP | 0 825 776 A2 | 2/1998 | ............ H04N/7/26 |
| EP | 0 891 101 A1 | 1/1999 | ............ H04N/7/32 |
| JP | 8-46934 | 2/1996 | .......... H04N/7/015 |
| JP | 8-56335 | 2/1996 | ............ H04N/7/01 |
| JP | 10-191353 | 7/1998 | ............ H04N/7/32 |
| JP | 10-243405 | 9/1998 | ............ H04N/7/32 |

* cited by examiner

*Primary Examiner*—Nhon T Diep
(74) *Attorney, Agent, or Firm*—Bell Boyd & Lloyd LLC

(57) ABSTRACT

A picture reducing circuit 1 reduces a supplied original picture. A higher picture memory 2 stores an input higher picture. A predictive tap extracting circuit 3 extracts predictive taps from the higher picture stored in the higher picture memory 2 and outputs the extracted predictive taps to a mapping circuit 4, predictive coefficient generating circuit 5, and pixel value updating circuit 8. The mapping circuit 4 calculates a linear combination of predictive taps and predictive coefficients and obtains a predictive picture. The predictive picture is output to an error calculating circuit 6. The error calculating circuit 6 calculates an error (S/N ratio) between pixel value of the predictive picture and that of the original picture. A comparing and determining circuit 7 controls a non-linear processing circuit 9 corresponding to the difference of the errors. The non-linear processing circuit 9 adds or subtracts a predetermined value to/from the pixel value of each pixel of the updated higher picture corresponding to the variation amount of pixel value updated by the pixel value updating circuit 8.

55 Claims, 9 Drawing Sheets

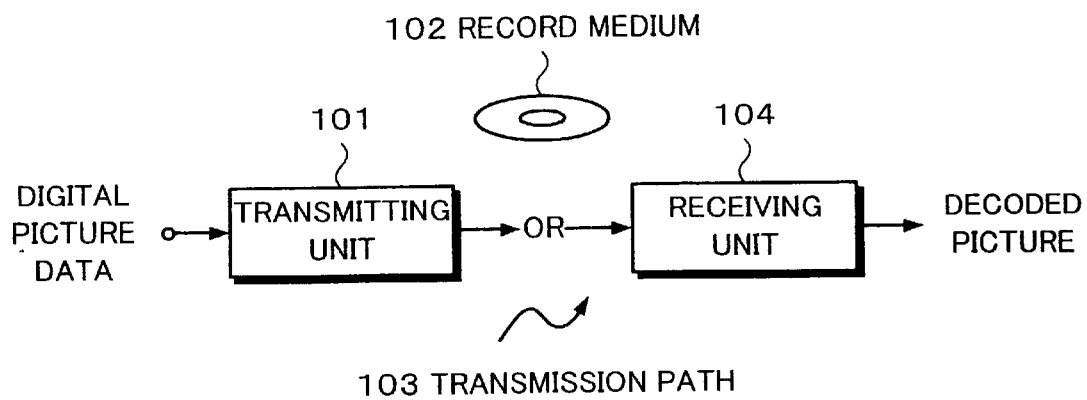
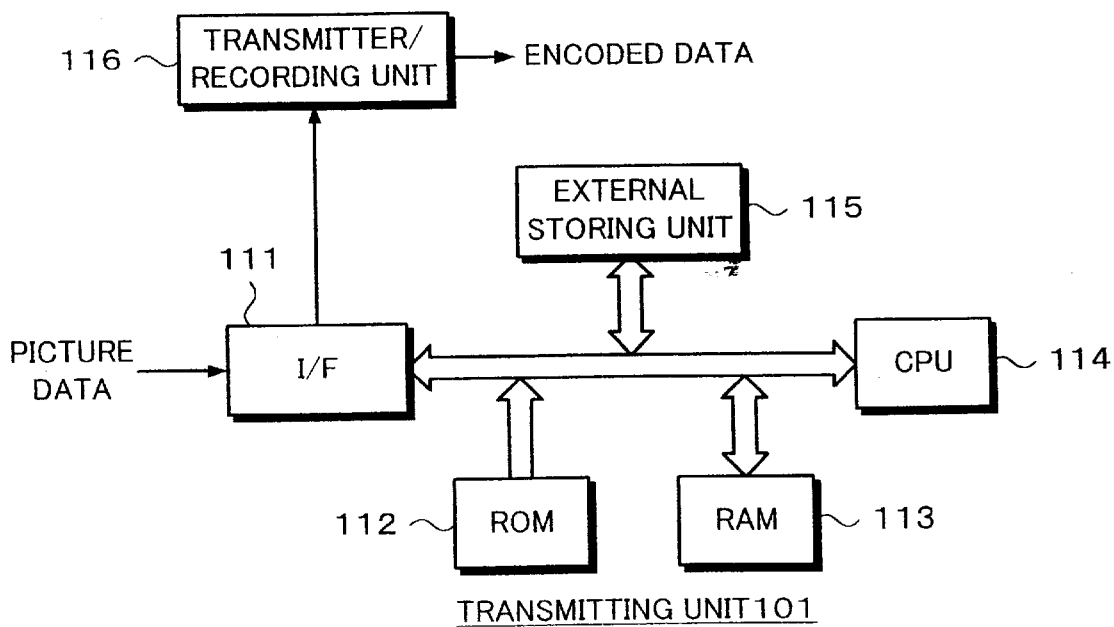

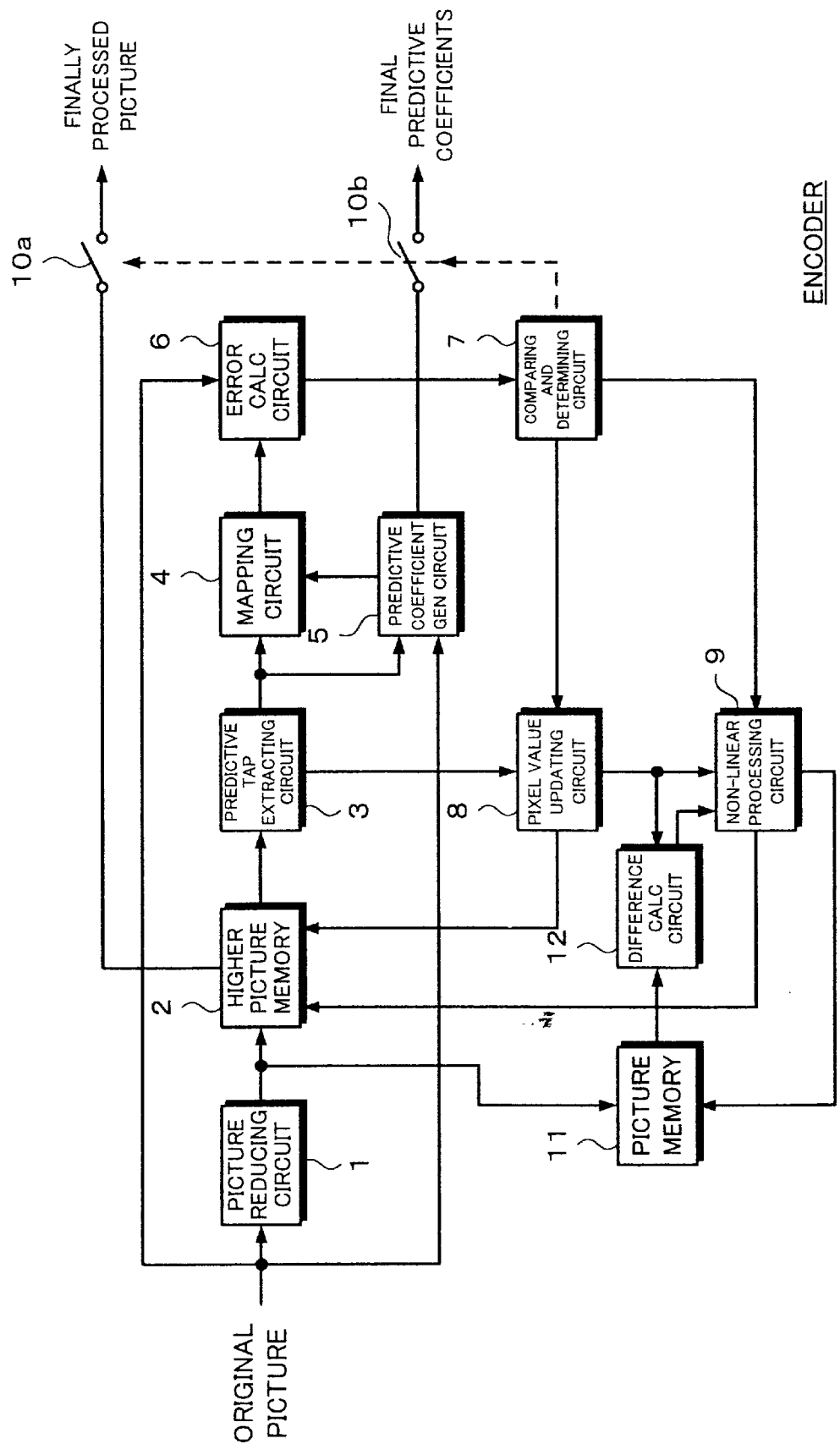

Fig. 7A — BEFORE OPTIMIZED

| 18 | 26 | 85 |
| --- | --- | --- |
| 20 | 74 | 130 |
| 60 | 156 | 209 |

Fig. 7B — AFTER OPTIMIZED

| 19 | 22 | 85 |
| --- | --- | --- |
| 31 | 73 | 132 |
| 60 | 150 | 130 |

Fig. 7C — AFTER NON-LINEAR PROCESS

| 21 | 20 | 85 |
| --- | --- | --- |
| 33 | 71 | 134 |
| 60 | 148 | 128 |

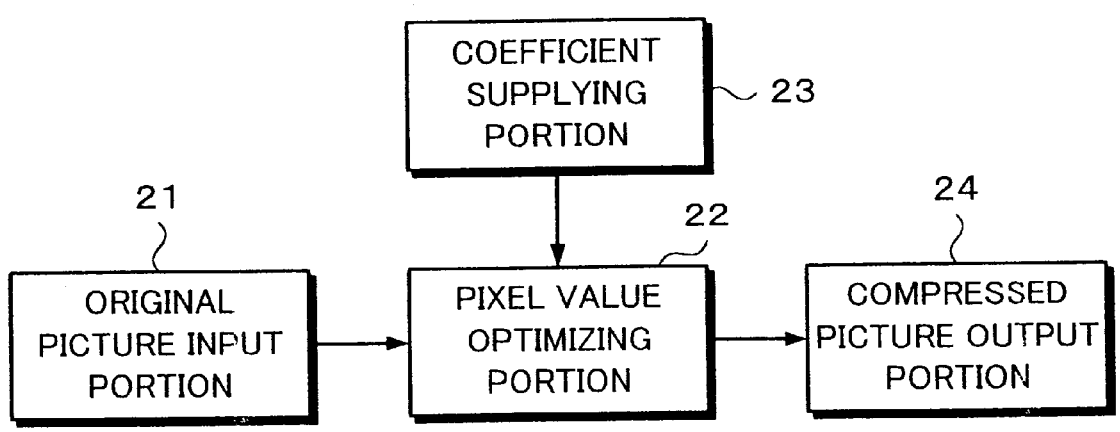
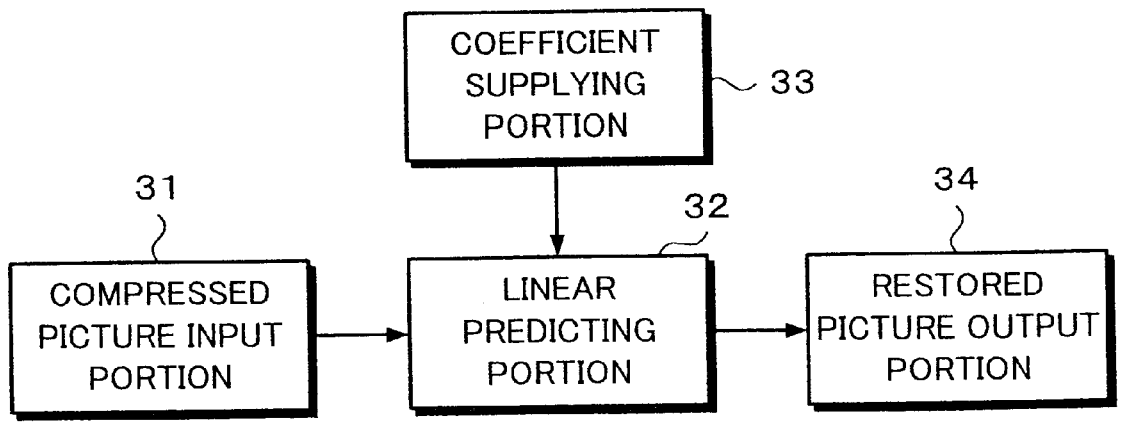

DATA CONVERTING APPARATUS, METHOD THEREOF, AND RECORDING MEDIUM

This application is a continuation of international application number PCTJP 99/05084, filed Sep. 17, 1999.

TECHNICAL FIELD

The present invention relates to a data converting apparatus, a method thereof, and a record medium, in particular, those that allow a picture whose quality is almost the same as an original picture to be restored.

RELATED ART

The inventor of the present invention has proposed a technology for generating a high resolution picture with a low resolution picture. The proposed technology is disclosed as Japanese Patent Laid-Open Publication No. HEI 10-93980. In the technology, with a low resolution picture of which a high resolution original is reduced, a high resolution picture whose quality is almost the same as the original picture is restored. In this proposed technology, for example, as shown in FIG. 1, pixel values of (3×3) pixels a to i around a pixel i of a high resolution picture (a restored picture) corresponding to a considered pixel I of a low resolution picture (a higher hierarchical level picture) are obtained by calculating for example a linear combination of a plurality of pixels (for example, (3×3) pixels A to I) of a low resolution picture adjacent to the pixels a to i and predetermined predictive coefficients. In addition, an error between the pixel values of the restored picture and the pixel values of the original picture is calculated. Corresponding to the calculated result, the pixel values of the low resolution picture or the predictive coefficients are (is) repeatedly updated.

However, as was described above, in such a method, although the error between the pixel values of the restored picture and the pixel values of the original picture is gradually becoming small, the decreasing speed of the error is low. To cause the error to be lower than a desired threshold value, the pixel values of the low resolution picture or the predictive coefficients should be repeatedly updated.

Therefore, an object of the present invention is to allow a compressed picture to be restored to an original picture by updating pixel values of a low resolution picture and predictive coefficients and performing a non-linear process for the updated results.

DISCLOSURE OF THE INVENTION

The invention of claim 1 is a picture data converting apparatus for converting first picture data into second picture data whose quality is lower than the first picture data, comprising:

an intermediate picture data generating portion for generating intermediate picture data whose quality is almost the same as the second picture data with the first picture data;

a storing portion for storing the intermediate picture data;

a predictive picture data generating portion for generating predictive picture data whose quality is almost the same as the first picture data according to the intermediate picture data stored in the storing portion and predictive coefficients;

an error detecting portion for detecting an error between the first picture data and the predictive picture data;

a first determining portion for determining whether or not a variation amount of the error detected by the error detecting portion is equal to or larger than a first threshold value;

a second determining portion for determining whether or not the error detected by the error detecting portion is equal to or larger than a second threshold value; and an adjusting portion for performing a first adjusting process for pixel value of the intermediate picture data stored in the storing portion based on the first input picture data when the variation amount of the error is equal to or larger than the first threshold value as the determined result of the first determining portion, for performing a second adjusting process for a pixel value of the intermediate picture data stored in the storing portion with a non-linear variation amount when the variation amount of the error is smaller than the first threshold value as the determined result of the first determining portion and when the error is equal to or larger than the second threshold value as the determined result of the second determining portion, and for determining the intermediate picture data stored in the storing portion as the second picture data when the error is smaller than the second threshold value as the determined result of the second determining portion.

The invention of claim 8 is a picture data converting method for converting first picture data into second picture data whose quality is lower than the first picture data, comprising the steps of:

generating intermediate picture data whose quality is almost the same as the second picture data with the first picture data;

storing the intermediate picture data;

generating predictive picture data whose quality is almost the same as the first picture data according to the stored intermediate picture data and predictive coefficients;

detecting an error between the first picture data and the predictive picture data;

determining whether or not a variation amount of the detected error is equal to or larger than a first threshold value;

determining whether or not the detected error is equal to or larger than a second threshold value;

performing a first adjusting process for a pixel value of the stored intermediate picture data based on the first input picture data when the variation amount of the error is equal to or larger than the first threshold value;

performing a second adjusting process for a pixel value of the stored intermediate picture data with a non-linear variation amount when the variation amount of the error is smaller than the first threshold value and when the error is equal to or larger than the second threshold value; and determining the stored intermediate picture data as the second picture data when the error is smaller than the second threshold value.

The invention of claim 15 is a data converting apparatus for converting first data into second data whose quality is lower than the first data, comprising:

an intermediate data generating portion for generating intermediate data whose quality is almost the same as the second data with the first data;

a storing portion for storing the intermediate data;

a predictive data generating portion for generating predictive data whose quality is almost the same as the first data according to the intermediate data stored in the storing portion and predictive coefficients;

an error detecting portion for detecting an error between the first data and the predictive data;

a first determining portion for determining whether or not a variation amount of the error detected by the error detecting portion is equal to or larger than a first threshold value;

a second determining portion for determining whether or not the error detected by the error detecting portion is equal to or larger than a second threshold value; and an adjusting portion for performing a first adjusting process for data values of the intermediate data stored in the storing portion based on the first input data when the variation amount of the error is equal to or larger than the first threshold value as the determined result of the first determining portion, for performing a second adjusting process for data values of the intermediate data stored in the storing portion with a non-linear variation amount when the variation amount of the error is smaller than the first threshold value as the determined result of the first determining portion and when the error is equal to or larger than the second threshold value as the determined result of the second determining portion, and for determining the intermediate data stored in the storing portion as the second data when the error is smaller than the second threshold value as the determined result of the second determining portion.

The invention of claim 22 is a data converting method for converting first data into second data whose quality is lower than the first data, comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not a variation amount of the detected error is equal to or larger than a first threshold value;

determining whether or not the detected error is equal to or larger than a second threshold value;

performing a first adjusting process for a data value of the stored intermediate data based on the first input data when the variation amount of the error is equal to or larger than the first threshold value, performing a second adjusting process for a data value of the stored intermediate data with a non-linear variation amount when the variation amount of the error is smaller than the first threshold value and when the error is equal to or larger than the second threshold value, and determining the stored intermediate data as the second data when the error is smaller than the second threshold value.

The invention of claim 29 is a record medium on which a program that causes a computer to convert first picture data into second picture data whose quality is lower than the first picture data is recorded, the program comprising the steps of:

generating intermediate picture data whose quality is almost the same as the second picture data with the first picture data;

storing the intermediate picture data;

generating predictive picture data whose quality is almost the same as the first picture data according to the stored intermediate picture data and predictive coefficients;

detecting an error between the first picture data and the predictive picture data;

determining whether or not a variation amount of the detected error is equal to or larger than a first threshold value;

determining whether or not the detected error is equal to or larger than a second threshold value;

performing a first adjusting process for a pixel value of the stored intermediate picture data based on the first input picture data when the variation amount of the error is equal to or larger than the first threshold value;

performing a second adjusting process for a pixel value of the stored intermediate picture data with a non-linear variation amount when the variation amount of the error is smaller than the first threshold value and when the error is equal to or larger than the second threshold value; and determining the stored intermediate picture data as the second picture data when the error is smaller than the second threshold value.

The invention of claim 30 is a record medium on which a program that causes a computer to convert first data into second data whose quality is lower than the first data is recorded, the program comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not a variation amount of the detected error is equal to or larger than a first threshold value;

determining whether or not the detected error is equal to or larger than a second threshold value;

performing a first adjusting process for data values of the stored intermediate data based on the first input data when the variation amount of the error is equal to or larger than the first threshold value, performing a second adjusting process for a data value of the stored intermediate data with a non-linear variation amount when the variation amount of the error is smaller than the first threshold value and when the error is equal to or larger than the second threshold value, and determining that the stored intermediate data is the second data when the error is smaller than the second threshold value.

The invention of claim 31 is a picture data converting apparatus for converting first picture data into second picture data whose quality is lower than the first picture data, comprising:

an intermediate picture data generating portion for generating intermediate picture data whose quality is almost the same as the second picture data with the first picture data;

a storing portion for storing the intermediate picture data;

a predictive picture data generating portion for generating predictive picture data whose quality is almost the same as the first picture data according to the intermediate picture data stored in the storing portion and predictive coefficients;

an error detecting portion for detecting an error between the first picture data and the predictive picture data;

a first determining portion for determining whether or not the error detected by the error detecting portion is equal to or larger than a first threshold value and determining the intermediate picture data as the second picture data when the error is smaller than the first threshold value;

a second determining portion for determining whether or not the number of times a linear adjusting process is successively performed is equal to or larger than the second threshold value when the error is equal to or larger than the first threshold value as the determined result of the first determining portion;

a first adjusting portion for linearly adjusting a pixel value of the intermediate picture data when the number of times is smaller than the second threshold value as the determined result of the second determining portion; and a second adjusting portion for non-linearly adjusting a pixel value of the intermediate picture data when the number of times is equal to or larger than the second threshold value as the determined result of the second determining portion, wherein the predictive picture data generating portion generates the predictive coefficients whenever the first adjusting portion and the second adjusting portion adjust the pixel value.

The invention of claim 36 is a picture data converting method for converting first picture data into second picture data whose quality is lower than the first picture data, comprising the steps of:

generating intermediate picture data whose quality is almost the same as the second picture data with the first picture data;

storing the intermediate picture data;

generating predictive picture data whose quality is almost the same as the first picture data according to the stored intermediate picture data and predictive coefficients;

detecting an error between the first picture data and the predictive picture data;

determining whether or not the detected error is equal to or larger than a first threshold value and determining the intermediate picture data as the second picture data when the error is smaller than the first threshold value;

determining whether or not the number of times a linear adjusting process is successively performed is equal to or larger than the second threshold value when the error is equal to or larger than the first threshold value;

linearly adjusting pixel value of the intermediate picture data when the number of times is smaller than the second threshold value; and non-linearly adjusting pixel value of the intermediate picture data when the number of times is equal to or larger than the second threshold value, wherein the predictive coefficients are generated whenever the linear adjustment and the non-linear adjustment are performed.

The invention of claim 41 is a data converting apparatus for converting first data into second data whose quality is lower than the first data, comprising:

an intermediate data generating portion for generating intermediate data whose quality is almost the same as the second data with the first data;

a storing portion for storing the intermediate data;

a predictive data generating portion for generating predictive data whose quality is almost the same as the first data according to the intermediate data stored in the storing portion and predictive coefficients;

an error detecting portion for detecting an error between the first data and the predictive data;

a first determining portion for determining whether or not the error detected by the error detecting portion is equal to or larger than a first threshold value and determining the intermediate data as the second data when the error is smaller than the first threshold value;

a second determining portion for determining whether or not the number of times a linear adjusting process is successively performed is equal to or larger than the second threshold value when the error is equal to or larger than the first threshold value as the determined result of the first determining portion;

a first adjusting portion for linearly adjusting data value of the intermediate data when the number of times is smaller than the second threshold value as the determined result of the second determining portion; and a second adjusting portion for non-linearly adjusting data value of the intermediate data when the number of times is equal to or larger than the second threshold value as the determined result of the second determining portion, wherein the predictive data generating portion generates the predictive coefficients whenever adjustments at the first adjusting portion and the second adjusting portion are performed.

The invention of claim 48 is a data converting method for converting first data into second data whose quality is lower than the first data, comprising the steps of:

generating intermediate data whose quality is almost the same as the second data with the first data;

storing the intermediate data;

generating predictive data whose quality is almost the same as the first data corresponding to the stored intermediate data and predictive coefficients;

detecting an error between the first data and the predictive data;

determining whether or not the detected error is equal to or larger than a first threshold value and determining the intermediate data as the second data when the error is smaller than the first threshold value;

determining whether or not the number of times a linear adjusting process is successively performed is equal to or larger than the second threshold value when the error is equal to or larger than the first threshold value;

linearly adjusting data value of the intermediate data when the number of times is smaller than the second threshold value; and non-linearly adjusting data value of the intermediate data when the number of times is equal to or larger than the second threshold value, wherein the predictive coefficients are generated whenever the linear adjustment and the non-linear adjustment are performed.

The invention of claim 54 is a record medium on which a program that causes a computer to convert first picture data into second picture data whose quality is lower than the first picture data is recorded, the program comprising the steps of:

generating intermediate picture data whose quality is almost the same as the second picture data with the first picture data;

storing the intermediate picture data;

generating predictive picture data whose quality is almost the same as the first picture data according to the stored intermediate picture data and predictive coefficients;

detecting an error between the first picture data and the predictive picture data;

determining whether or not the detected error is equal to or larger than a first threshold value and determining the intermediate picture data as the second picture data when the error is smaller than the first threshold value;

determining whether or not the number of times a linear adjusting process is successively performed is equal to or larger than the second threshold value when the error is equal to or larger than the first threshold value;

linearly adjusting pixel value of the intermediate picture data when the number of times is smaller than the second threshold value; and non-linearly adjusting pixel value of the intermediate picture data when the number of times is equal to or larger than the second threshold value, wherein the predictive coefficients are generated whenever the linear adjustment and the non-linear adjustment are performed.

The invention of claim 55 is a record medium on which a program that causes a computer to convert first data into second data whose quality is lower than the first data is recorded, the program comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not the detected error is equal to or larger than a first threshold value and determining the intermediate data as the second data when the error is smaller than the first threshold value;

determining whether or not the number of times a linear adjusting process is successively performed is equal to or larger than the second threshold value when the error is equal to or larger than the first threshold value;

linearly adjusting picture value of the intermediate data when the number of times is smaller than the second threshold value; and non-linearly adjusting picture value of the intermediate data when the number of times is equal to or larger than the second threshold value, wherein the predictive coefficients are generated whenever the linear adjustment and the non-linear adjustment are performed.

BRIEF DESCRIPTION OF DRAWINGS

FIG. 2 is a block diagram showing the overall structure of a picture data converting apparatus according to the present invention;

FIG. 3 is a block diagram showing an example of the functional structure of a transmitting unit shown in FIG. 2;

FIG. 4 is a block diagram showing an example of the structure of an encoder according to the present invention;

FIGS. 7A, 7B and 7C are schematic diagram for explaining the non-linear process;

FIG. 10 is a block diagram showing the structure of another encoder of the picture data converting apparatus according to the present invention;

FIG. 11 is a block diagram showing the structure of another encoder of the picture data converting apparatus according to the present invention.

BEST MODES FOR CARRYING OUT THE INVENTION

Figure 1:
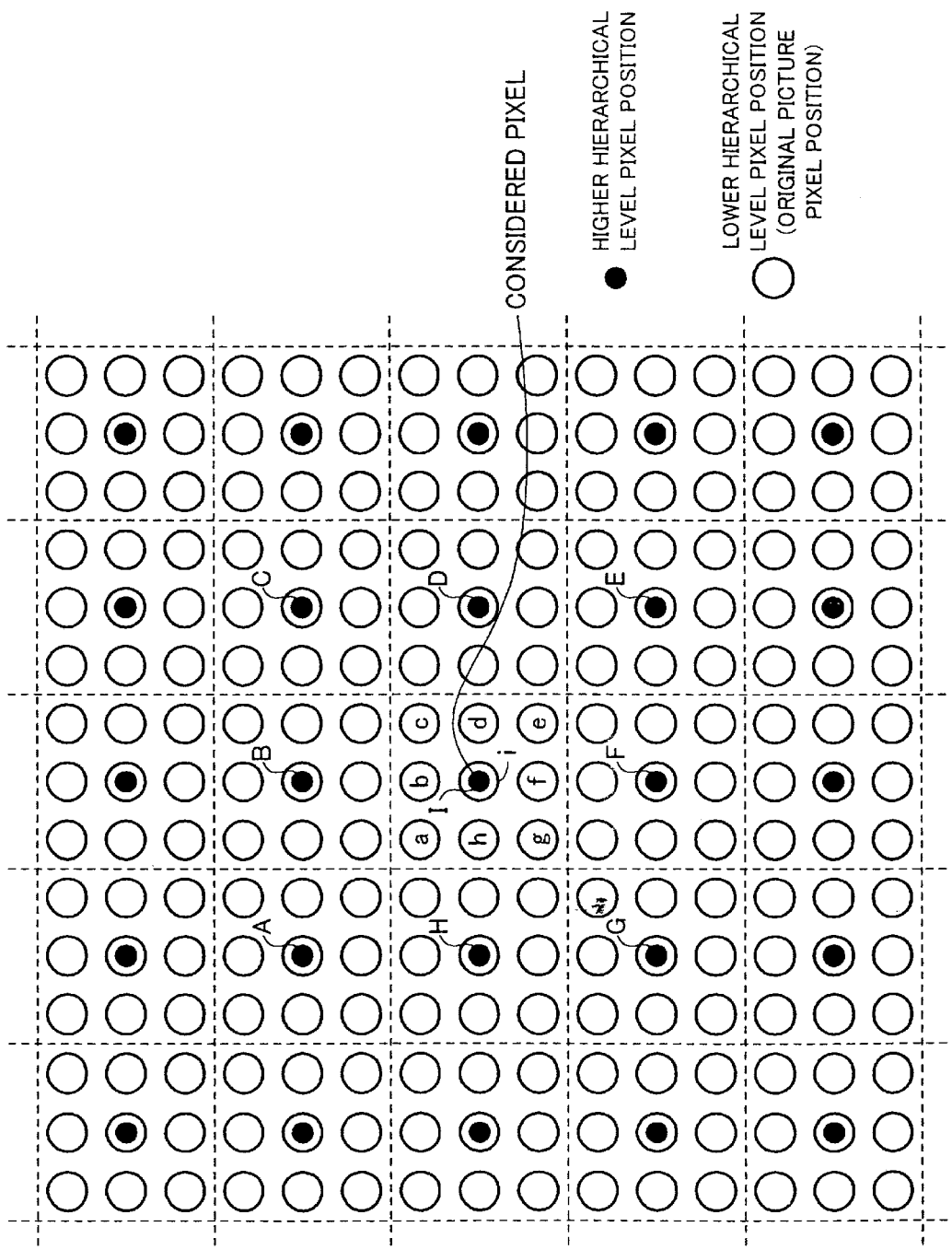
FIG. 1 is a schematic diagram showing an arrangement of pixels for explaining the above-mentioned encoding process (proposed by the inventor of the present invention)

Next, an embodiment of the present invention will be described. FIG. 2 shows the structure of a picture processing apparatus according to the present invention.

Digitized picture data is supplied to a transmitting unit 101. The transmitting unit 101 thins out the input picture data so as to compress the data amount of the input picture data. The resultant encoded data is recorded to a record medium 102 such as an optical disc or a magnetic tape. Alternatively, the encoded data is transmitted through a broadcast line (such as a satellite broadcast), or a transmission path (such as a telephone line or Internet).

A receiving unit 104 reproduces encoded data from the record medium 102. Alternatively, the receiving unit 104 receives encoded data through the transmission path 103 and decodes the encoded data. In other words, the receiving unit 104 decodes pixel values that have been thinned out. A decoded picture that is obtained from the receiving unit 104 is supplied to a display unit (not shown). The decoded picture is displayed on the display unit.

FIG. 3 shows an example of the structure of the transmitting unit 101. An I/F (Interface) 111 performs a receiving process and a transmitting process. In other words, the I/F 111 receives picture data from the outside and transmits encoded data to a transmitter—storing unit 116. A ROM 112 stores a program such as IPL (Initial Program Loading). A RAM 112 stores a system program (or OS: Operating System) and an application program that are recorded in an external storing unit 115. In addition, the RAM 113 stores data necessary for the operation of a CPU 114.

The CPU 114 loads the system program and the application program from the external storing unit 115 to the RAM 113 corresponding to the IPL program stored in the ROM 112. The CPU 114 executes the application program under the control of the system program. In other words, the CPU 114 performs an encoding process for picture data received from the interface 111. The encoding process will be described later.

The external storing unit 115 is for example a hard disk. The external storing unit 115 stores the system program, application program, and data. The transmitter—storing unit 116 records encoded data received from the interface 111 to the record medium 2. Alternatively, the transmitter—storing unit 116 transmits the encoded data through the transmission path 103. The interface 111, the ROM 112, the RAM 113, the CPU 114, and the external storing unit 115 are mutually connected through a bus.

In the transmitting unit 101, when picture data is supplied to the interface 111, the picture data is supplied to the CPU 114. The CPU 114 encodes the picture data and supplies the encoded data to the interface 111. The interface 111 records the encoded data to the record medium 102 through the transmitter—storing unit 116. Alternatively, the interface 111 transmits the decoded data through the transmission path 103.

FIG. 4 shows the functional structure of the encoder that is other than the transmitter—storing unit 116 in the transmitting unit 101 shown in FIG. 3. The encoder can be accomplished by hardware, software, or a combination thereof. When a record medium on which a program for an encoding process shown in a flow chart that follow is stored is mounted to a drive and then the program is installed to the external storing unit 115, the function of the encoder can be accomplished.

As a record medium on which such a computer program is stored, a magnetic disk, a CD-ROM, a solid-state memory, a network, or a communication medium such as a satellite can be used.

In the encoder shown in FIG. 4, input original picture data is supplied to a picture reducing circuit 1, predictive coefficient generating circuit 5, and an error calculating circuit 6.

The picture reducing circuit 1 divides the supplied original picture (high resolution picture) into a plurality of blocks each of which is composed of 3×3 pixels. Thereafter, the picture reducing circuit 1 generates an initial higher hierarchical level picture of which the average value of nine pixels of each block is the pixel value of a pixel of a higher hierarchical level picture (low resolution picture) at the center of each block of the original picture and obtains an initial higher hierarchical level picture. The initial higher hierarchical level picture is output to a higher picture memory 2 and a difference calculating picture memory 11. Thus, the higher hierarchical level picture (hereinafter referred to as higher picture) is reduced so that each of the number of vertical pixels and the number of horizontal pixels of an original picture becomes ⅓.

When a higher picture is formed, besides the average value, for example, the pixel value at the center of each block, the middle value of a plurality of pixels values of each block, or the majority value of a plurality of pixel values of each block can be used.

The higher picture memory 2 stores a higher picture received from the picture reducing circuit 1. In addition, the higher picture memory 2 updates the stored higher picture with an updated higher picture that is input from the pixel value updating circuit 8 or a higher picture that is non-linear processed and received from the non-linear processing circuit 9. In addition, the higher picture memory 2 outputs the stored higher picture data to a decoder that is a receiving unit (not shown) through a switch 10a.

A final predictive coefficients generated by the predictive coefficient generating circuit 5 is output to the decoder (receiving unit) (not shown) through a switch 10b. Both the switches 10a and 10b are controlled by a comparing and determining circuit 7.

A predictive tap extracting circuit 3 successively extracts predictive taps each of which is composed of 3×3 pixels (in the example shown in FIG. 1, pixels A to I) with considered pixels of the higher picture stored in the higher picture memory 2 (each pixel is denoted by a black dot in FIG. 1). The predictive tap extracting circuit 3 outputs the extracted predictive taps to the mapping circuit 4, the predictive coefficient generating circuit 5, and the pixel value updating circuit 8. It should be noted that the size of each predictive tap extracted from the picture is not limited to 3×3 pixels. Instead, the size of each predictive tap may be 5×5 pixels.

The predictive coefficient generating circuit 5 solves a normal equation corresponding to the method of least squares using nine predictive taps that are input from the predictive tap extracting circuit 3 and nine pixel values corresponding to the original picture. In this example, nine predictive coefficient sets are calculated. Each predictive coefficient set is composed of nine predictive coefficients. The calculated predictive coefficients are supplied to a mapping circuit 4.

As expressed by formula (1), the mapping circuit 4 calculates a linear combination of pixel values $Xj$ ($j=0, 1, 2, \ldots, 8$) [of predictive taps (pixels A to I) as pixel values $Yn$ ($n=0, 1, 2, \ldots, 8$) of 3×3 pixels (pixels a to i) around a pixel (pixel i) of a lower hierarchical level picture (hereinafter referred to as lower picture or predictive picture) corresponding to a center pixel (for example, the pixel I shown in FIG. 1) of each predictive tap that is input from the predictive tap extracting circuit 3] and predictive coefficients $k(n, j)$ [received from the predictive coefficient generating circuit 5] and supplies the calculated results to the error calculating circuit 6.

$$Yn = \sum k(n, j)Xj \qquad (1)$$

The error calculating circuit 6 calculates an error (S/N ratio) between the pixel values of the predictive picture that are input from the mapping circuit 4 and the pixel values of the original picture. The sum of the error of each pixel of the entire picture is defined as error. As the relation between the error and the S/N ratio, the error is the reciprocal of the S/N ratio (namely, 1/(S/N)). The error calculating circuit 6 outputs the S/N ratio to the comparing and the determining circuit 7.

The comparing and determining circuit 7 calculates the difference between the error (S/N ratio) that is input from the error calculating circuit 6 and the error (S/N ratio) that has been input from the error calculating circuit 6 and stored in a memory and determines whether the difference is smaller than a predetermined threshold value (namely, the decrease of the error converges). Corresponding to the determined result, the comparing and determining circuit 7 controls the pixel value updating circuit 8 or the non-linear processing circuit 9 corresponding to the determined result. In addition, the comparing and determining circuit 7 determines whether or not the input error (S/N ratio) is equal to or larger than a predetermined threshold value. Corresponding to the determined result, the comparing and determining circuit 7 controls the switches 10a and 10b.

In other words, when the S/N ratio is equal to or larger than the threshold value, the switches 10a and 10b are turned on. Thus, the pixels of the higher picture that are stored in the higher picture memory 2 and the predictive coefficients are output. Unless the S/N ratio is equal to or larger than the threshold value, the switches 10a and 10b are turned off. Thus, the pixels of the higher picture are not output.

The pixel value updating circuit 8 optimizes the pixel values of the higher picture that are input from the predictive tap extracting circuit 3 so that the error between the predictive picture and the original picture becomes small (namely, so that the S/N ratio improves). The optimized higher picture (updated higher picture) is output to the higher picture memory Initially, the difference calculating picture memory 11 obtains an initial higher picture from the picture reducing circuit 1 and stores the obtained initial higher picture. Thereafter, whenever the non-linear process is performed, the difference calculating picture memory 11 obtains the processed picture from the non-linear processing circuit 9 and stores the processed picture. Output data of the picture memory 11 and the updated pixel values received from the pixel value updating circuit 8 are supplied to the difference calculating circuit 12. When the difference calculating circuit 12 performs the non-linear process, the picture memory 11 supplies the stored picture as a reference for calculating the difference to the difference calculating circuit 12.

When the difference calculating circuit 12 performs the non-linear process, the difference calculating circuit 12 obtains picture information from the pixel value updating circuit 8 and the difference calculating picture memory 11, calculates the difference therebetween, and supplies the calculated difference to the non-linear processing circuit 9.

The non-linear processing circuit 9 adds or subtracts a predetermined value to/from the pixel value of each pixel of the higher picture updated by the pixel value updating circuit 8 corresponding to the variation of the updated pixel values that are input from the difference calculating circuit 12 and outputs the resultant values to the higher picture memory 2 and the difference calculating picture memory 11.

Figure 5:
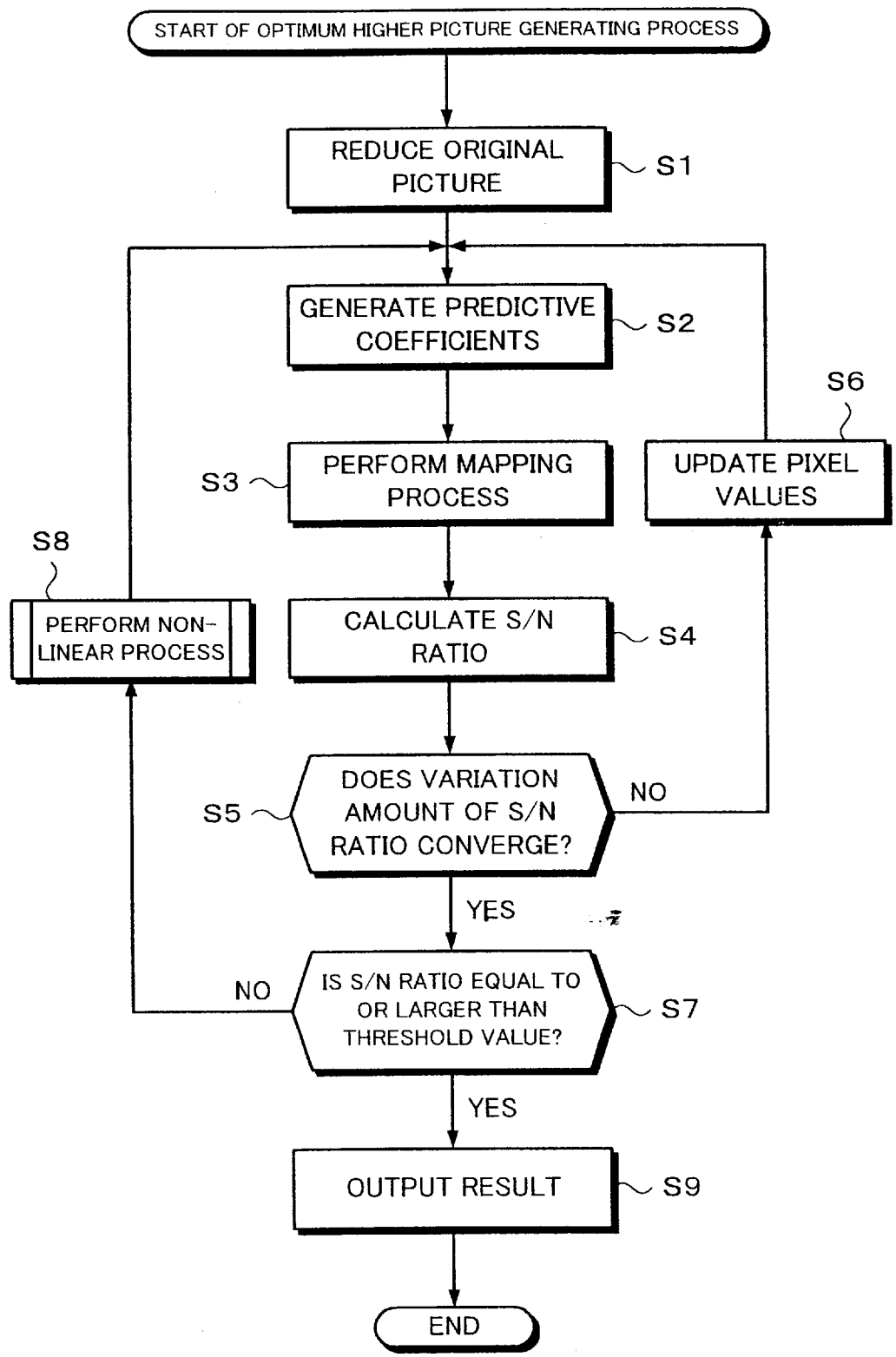
FIG. 5 is a flow chart for explaining an example of an optimum higher hierarchical level picture generating process of the encoder.

Next, with reference to a flow chart shown in FIG. 5, the optimum higher picture generating process of the encoder will be described. At step S1, the picture reducing circuit 1 divides a supplied original picture (high resolution picture) into blocks each of which is composed of 3×9 pixels. The picture reducing circuit 1 generates an initial higher picture of which the average value of the pixel values of nine pixels of each block is the pixel value of a pixel of a higher picture (low resolution picture) at the center of each block of the high resolution picture. The initial higher picture is output to the higher picture memory 2. The higher picture memory 2 stores the higher picture that is input form the picture reducing circuit 1. In addition, the picture reducing circuit 1 outputs the initial higher picture to the difference calculating picture memory 11. The picture memory 1 stores the initial higher picture.

At step S2, the predictive tap extracting circuit 3 successively extracts predictive taps each of which is composed of 3×3 pixels (in the example shown in FIG. 1, pixels A to I) with considered pixels of the higher picture stored in the higher picture memory 2. The predictive tap extracting circuit 3 outputs the extracted predictive taps to the mapping circuit 4, the predictive coefficient generating circuit 5, and the pixel value updating circuit 8. The predictive coefficient generating circuit 5 generates a normal equation with predictive taps that are input from the predictive tap extracting circuit 3 and pixel values of the original picture, solves the normal equation using the method of least squares, generates nine predictive coefficient sets, and supplies the generated predictive coefficients to the mapping circuit 4.

At step S3, as expressed by formula (1), the mapping circuit 4 calculates a linear combination of pixel values $X_j$ (j=0, 1, 2, ..., 8) [of predictive taps (pixels A to I) as pixel values $Y_n$ (n=0, 1, 2, ...,8) of 3×3 pixels (pixels a to i) around a pixel (pixel i) of a lower picture (predictive picture) corresponding to a center pixel (for example, the pixel I shown in FIG. 1) of each predictive tap that is input from the predictive tap extracting circuit 3] and predictive coefficients k(n, j) [received from the predictive coefficient generating circuit 5] and supplies the calculated results to the error calculating circuit 6.

At step S4, the error calculating circuit 6 calculates the error (S/N ratio) between the pixel values of the predictive picture that are input from the mapping circuit 4 and the pixel values of the original picture and outputs the result to the comparing and determining circuit 7. At step S5, the comparing and determining circuit 7 calculates the difference between the error (S/N ratio) that is input from the error calculating circuit 6 and the error (S/N ratio) that has been input from the error calculating circuit 6 and stored to the memory and determines whether or not the difference is lower than a predetermined threshold value (namely, the variation amount of the S/N ratio converges). When the difference is not larger than the predetermined threshold value (namely, the S/N ratio does not converge), the flow advances to step S6.

At step S6, the pixel value updating circuit 8 optimizes (updates) pixel values of the higher picture that are input from the predictive tap extracting circuit 3 under the control of the comparing and determining circuit 7 so that the error between the predictive picture and the original picture becomes small. The pixel value updating circuit 8 outputs the updated higher picture (updated higher picture) to the higher picture memory 2.

Thereafter, unless the difference of the errors is equal to or lower than the threshold value (namely, the S/N ratio converges) at step S5, a loop of steps S2 to S6 is repeated. When the difference of the errors is equal to or lower than the threshold value as the determined result, the flow advances to step S7.

At step S7, the comparing and determining circuit 7 determines whether or not the error (S/N ratio) that is input from the error calculating circuit 6 is equal to or larger than a predetermined threshold value (that is different from the threshold value of the difference of the errors). When the error (S/N ratio) is smaller than the predetermined threshold value as the determined result, the flow advances to step S8.

Figure 6:
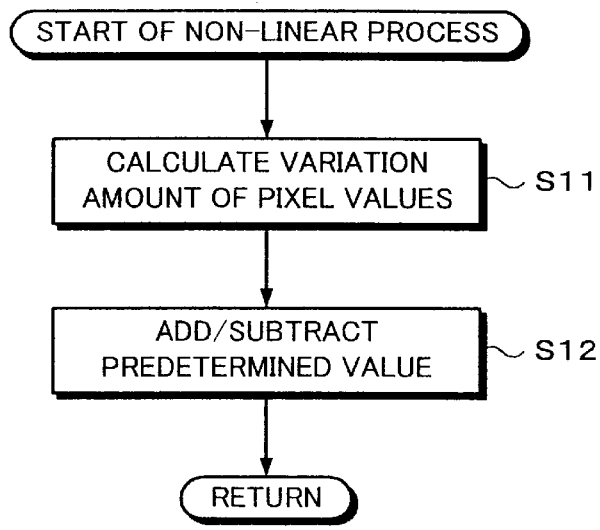
FIG. 6 is a flow chart for explaining a non-linear process at step S8 shown in FIG. 5.

At step S8, the non-linear processing circuit 9 adds or subtracts a predetermined value to/from pixel values of the higher picture updated by the pixel value updating circuit 8 under the control of the comparing and determining circuit 7 and outputs the resultant values to the higher picture memory 2. With reference to a flow chart shown in FIG. 6, the non-linear process will be described in detail.

At step S11, the difference calculating circuit 12 subtracts each pixel value stored in the difference calculating picture memory 11 from each pixel value of the updated higher picture that is output to the higher picture memory 2 and outputs the resultant value to the non-linear processing circuit 9.

At step S12, when the subtracted result that is input from the difference calculating circuit 12 is positive at step S11, the non-linear processing circuit 9 adds a predetermined value to each pixel value of the higher picture. When the subtracted result is negative, the non-linear processing circuit 9 subtracts a predetermined value from each pixel value of the updated higher picture. The obtained picture that has been non-linear processed (see FIG. 7C) is output to the higher picture memory 2. The higher picture memory 2 updates the stored higher picture with the input picture that has been non-linear processed. In addition, the non-linear processing circuit 9 outputs the non-linear processed picture to the difference calculating picture memory 11.

FIG. 7A shows an example of a predictive tap (pixel values before optimized) that are input from the predictive tap extracting circuit 3. FIG. 7B shows an example of an updated higher picture that is output from the pixel value updating circuit 8 to the higher picture memory 2.

For example, assuming that the pixel value of a pixel of an updated higher picture optimized by the pixel value updating circuit 8 is 19 and that the pixel value of a predictive tap that is input from the predictive tap extracting circuit 3 is 18, since the subtracted result is 1 (=19−18) (namely, a positive value), a predetermined value (for example, 2) is added. Thus, the pixel value of the picture that is output to the higher picture memory 2 becomes 21 (=19+2). Assuming that the pixel value of a pixel of an updated higher picture optimized by the pixel value updating circuit 8 is 22 and that the pixel value of a pixel of the predictive tap that is input from the predictive tap extracting circuit 3 is 26, since the subtracted result is −4 (=22−26) (namely, a negative value), a predetermined value is subtracted. Thus, the pixel value of the picture that is output to the higher picture memory 2 becomes 20 (=22−2).

Returning to FIG. 5, at step S7, until the error (S/N ratio) is equal to or larger than a predetermined threshold value, a loop of steps S2 to S8 is repeated. When the error (S/N ratio) is equal to or larger than the predetermined threshold value as the determined result at step S7, the flow advances to step S9. At step S9, the comparing and determining circuit 7 turns on the switches 10a and 10b so that the higher picture data stored in the picture memory 2 and the predictive coefficients are output to a record medium or a transmission path (not shown).

When the final higher picture data of the entire picture and the predictive coefficients are obtained, they are output at step S9. In addition, the higher picture data and predictive coefficients may be multiplexed and transmitted.

In the above-described embodiment, when the ratio of the decrease of the error (S/N ratio) converges, the non-linear process is performed. Alternatively, whenever pixel values and predictive coefficients are updated a predetermined number of times, the non-linear process may be executed.

Figure 8:
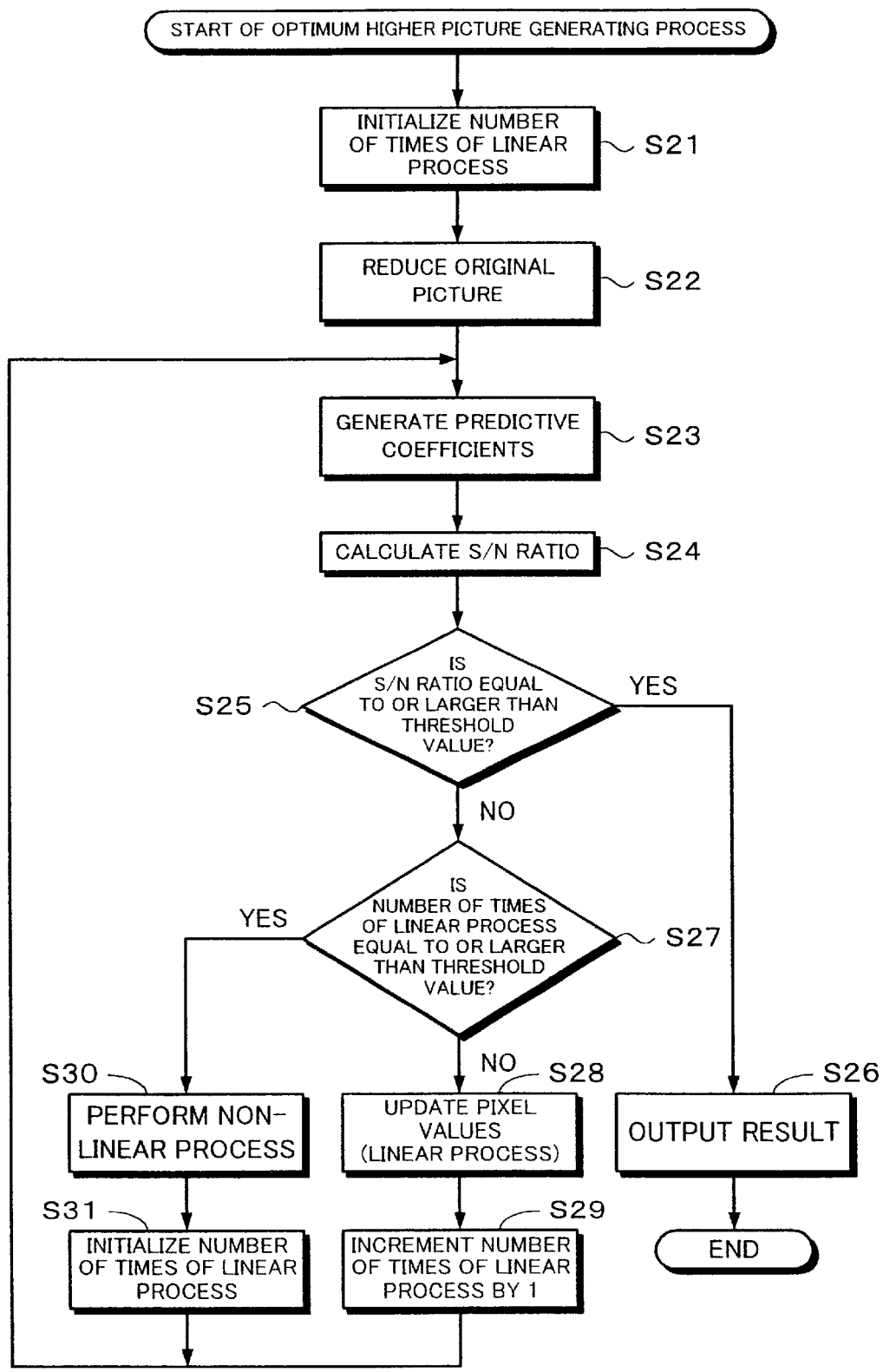
FIG. 8 is a flow chart for explaining another example of the optimum higher hierarchical level picture generating process of the encoder.

FIG. 8 is a flow chart showing a non-linear process that is executed whenever pixel values and predictive coefficients are updated a predetermined number of times. This process is performed under the control of the CPU 114 corresponding to a software program that is installed from the outside or stored in the ROM 112 shown in FIG. 3. In other words, each step is performed under the control of the CPU 114 corresponding to the software program.

At step S21, the number of times of the linear process is initialized. Thereafter, at step S22, an initial higher picture is generated. At step S23, predictive taps (each of which is composed of 3×3 pixels) are successively extracted with each considered pixel of the higher picture. With the extracted predictive taps and the pixel values of the original picture, a normal equation is generated. The normal equation is solved with the method of least squares and thereby nine predictive coefficient sets are generated.

At step S24, as expressed by formula (1), a linear combination of pixel values $X_j$ (j=0, 1, 2, . . . ,8) [of predictive taps (pixels A to I) as pixel values $Y_n$ (n=0, 1, 2, . . . , 8) of 3×3 pixels (pixels a to i) around a pixel (pixel i) of a lower picture (predictive picture) corresponding to a center pixel (for example, the pixel I shown in FIG. 1) of each predictive tap that is input from the predictive tap extracting circuit 3] and predictive coefficients k(n, j) [received from the predictive coefficient generating circuit 5] is calculated.

At step S24, the error (S/N ratio) between each pixel value of the predictive picture and the relevant pixel value of the original picture is calculated. At step S25, it is determined whether or not the error (S/N ratio) is equal to or larger than a predetermined threshold value. When the error is equal to or larger than the threshold value, the flow advances to step S26. At step S26, the pixel value of the predictive picture is output.

At step S25, when the S/N ratio is smaller than the threshold value as the determined result at step S25, the flow advances to step S27. At step S27, it is determined whether or not the number of times of the linear process is equal to or larger than a threshold value (the number of times that is set at step S21). When the number of times of the linear process is smaller than the threshold value as the determined result at step S27, the flow advances to step S28. At step S28, the pixel values are updated (namely, the linear process is performed). In other words, the pixel values of the higher picture are optimized so that the error between the predictive picture and the original picture becomes small (the S/N ratio improves).

Next, the count value of the number of times of the linear process is incremented by 1 (at step S29). Thereafter, the flow returns to step S23 (predictive coefficient generating process). Thereafter, a loop after step S23 is repeated. When the S/N ratio is smaller than the threshold value as the determined result at step S25 and when the number of times of the non-linear process is equal to or larger than the threshold value as the determined result at step S27, the flow advances to step S30. At step S30, the non-linear process is performed. As with the above-described example, in the non-linear process, a predetermined value is added or subtracted to/from each pixel value of the updated higher picture and the resultant pixel value is output to the higher picture memory.

After the non-linear process is performed at step S30, the flow advances to step S31. At step S31, the number of times of the linear process is performed. Thereafter, the flow returns to step S23.

Figure 9:
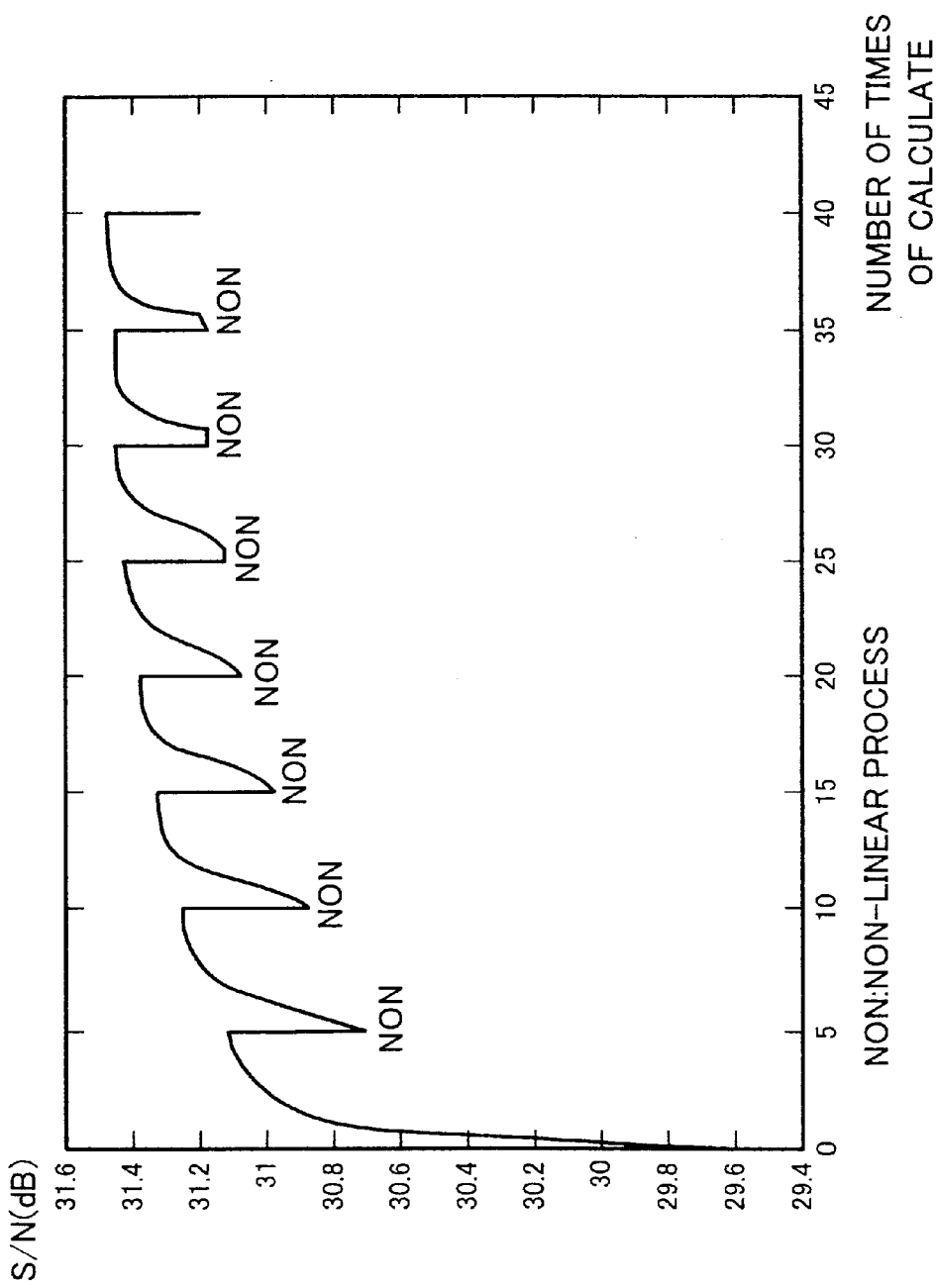
FIG. 9 is a schematic diagram for explaining the non-linear process.

FIG. 9 shows a simulation result of which the non-linear process is performed whenever pixel values and predictive coefficients are updated four times in the example shown in FIG. 8. In FIG. 9, even if the speed of the decrease of the error (variation amount of S/N ratio/number of times of calculation) converges, when the non-linear process is performed, the S/N ratio improves with a smaller number of times of the calculation than that of which pixel values and predictive coefficients are repeatedly updated.

According to the above-described embodiment, both predictive coefficients and pixel values of a higher picture are optimized. However, according to the present invention, when predictive coefficients are pre-obtained, only pixel values can be optimized. In this case, with a digital picture for determining coefficients, predictive coefficients are pre-generated with the same process as the predictive coefficient generating process of the encoder. Since the predictive coefficients are used in common with the encoder and the decoder, it is not necessary to record them to a record medium or transmit them.

FIG. 10 shows an outlined structure of the encoder in the case that predictive coefficients are pre-determined. FIG. 11 shows an outlined structure of the decoder corresponding to the encoder shown in FIG. 10.

In FIG. 10, reference numeral 21 is an original picture input portion. The original picture input portion is for example a picture memory. Reference numeral 22 is a pixel value optimizing portion. Predictive coefficients are supplied from a coefficient supplying portion 23 to the pixel value optimizing portion 22. The coefficient supplying portion 23 has a memory that stores pre-determined predictive coefficients. Except that the predictive coefficients are pre-determined, the structure of the pixel value optimizing portion 22 is the same as that shown in FIG. 4.

In other words, by a linear combination of predictive coefficients that are output from the coefficient supplying portion 23 and extracted predictive taps, predictive values are generated. Pixel values are optimized so that the error (S/N ratio) between each predictive value and each pixel value of a considered pixel is smaller than a threshold value. When the variation of the S/N ratio converges and the S/N ratio is smaller than the threshold value or when the linear process is performed a predetermined number of times and the S/N ratio is smaller than the threshold value, the pixel value optimizing portion 22 performs the non-linear process. A finally processed picture that is output from the pixel value optimizing portion 22 is recorded to a record medium or to a transmission path through a compressed picture output portion 24.

A compressed picture input portion 31 of the decoder reproduces a compressed picture composed of pixel values optimized by the encoder from a record medium. Alternatively, the compressed picture input portion 31 receives a compressed picture from the transmission path. The compressed picture is supplied from the compressed picture input portion 31 to a linear predicting portion 32. Predictive coefficients that are used in the encoder are supplied from a coefficient supplying portion 33 to the linear predicting portion 32.

The linear predicting portion 32 calculates a linear combination of predictive coefficients and extracted predictive taps and then calculates the pixel values of the restored picture. The pixel values of the restored picture received from the linear predicting portion 32 are output to a restored picture output portion 34. The restored picture output portion 34 has a memory and outputs the restored picture to an output unit such as a display unit.

Figure 12:
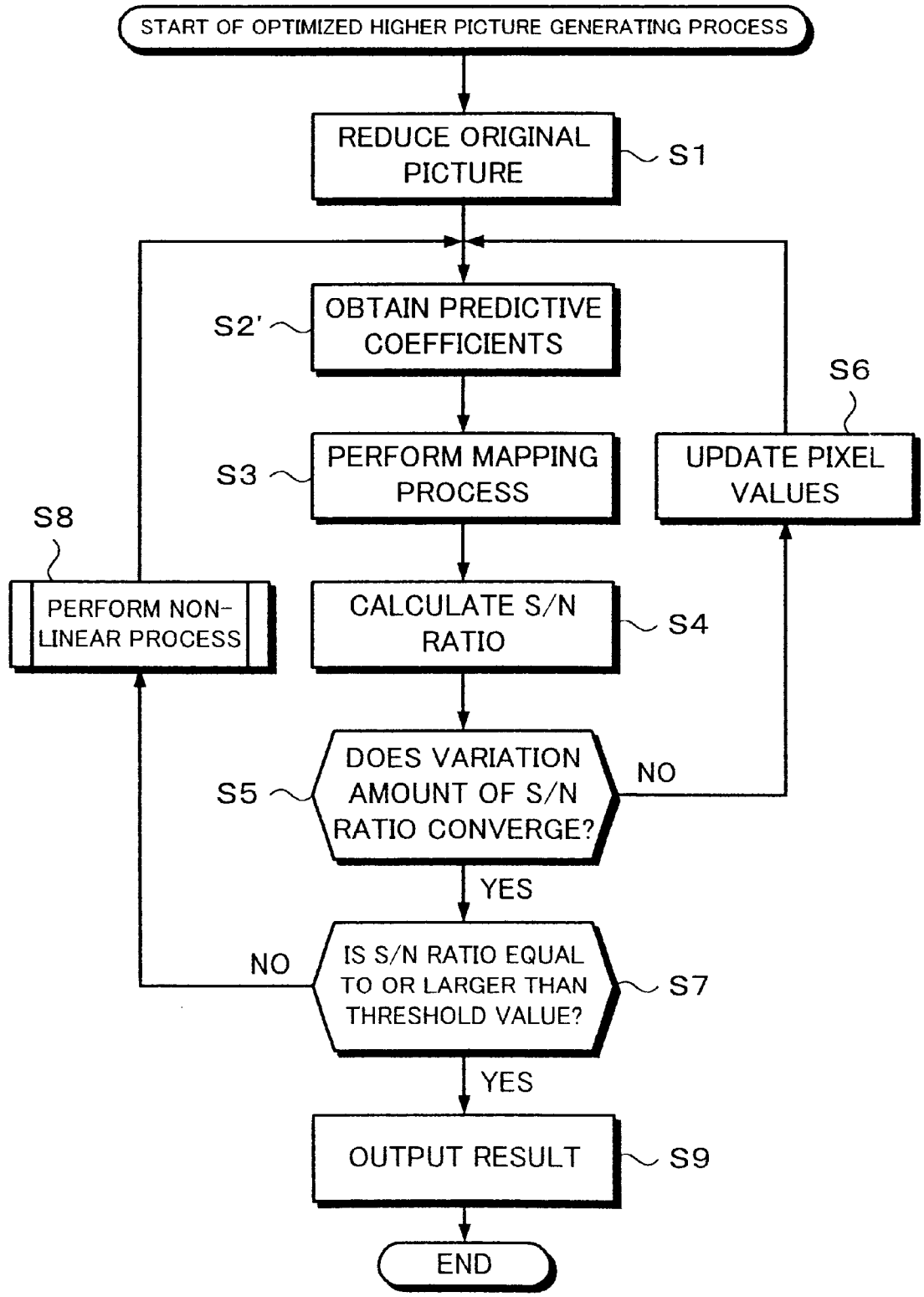
FIG. 12 is a flow chart for explaining the optimum higher hierarchical level picture generating process of another example of the picture data converting apparatus according to the present invention.

FIG. 12 is a flow chart showing the process of the pixel value optimizing portion 22 of the encoder shown in FIG. 10. For simplicity, in FIG. 12, similar steps to those in FIG. 5 are denoted by similar step numbers and their description is omitted. The difference between the process shown in FIG. 12 and the process shown in FIG. 5 is in that predictive coefficients are obtained from the coefficient supplying portion 23 instead of generating predictive coefficients.

Next, the process of the pixel value optimizing portion 22 will be described. In other words, a method for optimizing pixel values of a compressed picture in the case that a particular predictive coefficients group is pre-determined will be described. The algorithm of the simplest example is as follows.

Only one pixel of a tap (normally, the center pixel of the tap) is optimized.

After the pixel is decoded without a calculation, the result is compared with the original pixel so as to obtain an optimum solution.

It is assumed that the value I of a pixel of an original picture is predicted with a pixel of a compressed picture. In this example, the pixel values of a predictive tap of the compressed picture are denoted by $x_j$ (where j represents the position in the tap). In this case, the coefficients of the pixel values in the tap are denoted by $k_{ij}$.

In this case, the predictive expression is given as follows.

$$I' = \sum_{j=0}^{n} k_{ij} x_j$$

where I' is the predicted result.

Assuming that a pixel varied in the tap is denoted by $x_c$, the above expression is modified as follows.

$$I' = k_{i0}x_0 + k_{i1}x_1 + \ldots + k_{ic}x_c + \ldots + k_{in}x_n$$

where $x_c$ is varied for all available values (in the case of eight bits, [0, 255]), I' is calculated in all cases.

$$I'_0 = k_{i0}x_0 + k_{i1}x_1 + \cdots + k_{ic} \cdot 0 + \cdots + k_{in}x_n$$
$$I'_1 = k_{i0}x_0 + k_{i1}x_1 + \cdots + k_{ic} \cdot 1 + \cdots + k_{in}x_n$$
$$\vdots$$
$$I'_{255} = k_{i0}x_0 + k_{i1}x_1 + \cdots + k_{ic} \cdot 255 + \cdots + k_{in}x_n$$

In I'm : m=[0, 255], x that satisfies |I−I'x|=min (in other words, the error is minimum) is obtained. The obtained value is output as an optimum value.

In the above-described example, as an example of a higher picture whose quality is lower than the original picture, pixels of the original picture are thinned out at predetermined intervals. However, by decreasing the number of quantizing bits, the higher picture may be generated. For example, as disclosed in Japanese Patent Laid-Open Publication No. HEI 7-85267, the number of quantizing bits can be decreased.

In the above-described example, the present invention was applied to the process for picture data. In addition, the present invention can be applied to the process for audio data. When the present invention is applied to the process for audio data, the process is performed at intervals of a predetermined number of samples that are successive on time axis and that correlate.

As described above, according to the present invention, pixel values are optimized so that the error between each pixel value of a predictive picture and each pixel value of an input picture becomes minimum. In this case, with the non-linear process, the optimizing process time can be shortened.

What is claimed is:

1. A picture data converting apparatus for converting first picture data into second picture data whose quality is lower than the first picture data, comprising:
   an intermediate picture data generating portion for generating intermediate picture data whose quality is almost the same as the second picture data with the first picture data;
   a storing portion for storing the intermediate picture data;
   a predictive picture data generating portion for generating predictive picture data whose quality is almost the same as the first picture data according to the intermediate picture data stored in said storing portion and predictive coefficients;

an error detecting portion for detecting an error between the first picture data and the predictive picture data;

a first determining portion for determining whether or not a variation amount of the error detected by said error detecting portion is equal to or larger than a first threshold value;

a second determining portion for determining whether or not the error detected by said error detecting portion is equal to or larger than a second threshold value; and an adjusting portion for performing a first adjusting process for pixel values of the intermediate picture data stored in said storing portion based on the first input picture data when the variation amount of the error is equal to or larger than the first threshold value as the determined result of said first determining portion, for performing a second adjusting process for a pixel value of the intermediate picture data stored in said storing portion with a non-linear variation amount when the variation amount of the error is smaller than the first threshold value as the determined result of said first determining portion and when the error is equal to or larger than the second threshold value as the determined result of said second determining portion, and for determining the intermediate picture data stored in said storing portion as the second picture data when the error is smaller than the second threshold value as the determined result of said second determining portion.

2. The picture data converting apparatus as set forth in claim 1, wherein the number of pixels of the first picture data is larger than that of the second picture data.

3. The picture data converting apparatus as set forth in claim 1, further comprising:

predictive coefficients generating portion for newly generating the predictive coefficients whenever said adjusting portion adjusts pixel values of the intermediate picture data.

4. The picture data converting apparatus as set forth in claim 3, further comprising:

an output portion for outputting said second output picture data and the predictive coefficients.

5. The picture data converting apparatus as set forth in claim 1, wherein said adjusting portion performs the second adjusting process by adding or subtracting a predetermined value to/from each pixel value of the intermediate picture data stored in said storing portion.

6. The picture data converting apparatus as set forth in claim 5, wherein said adjusting portion performs the second adjusting process by adding or subtracting the predetermined value to/from each pixel value of the intermediate picture data corresponding to the direction of the variation of the error detected by said error detecting portion.

7. The picture data converting apparatus as set forth in claim 1, further comprising:

an output portion for determining that the intermediate picture data stored in said storing means as second output picture data and outputting the second output picture data, wherein said adjusting means determines that the intermediate picture data stored in said storing portion is the output picture data and outputs the output picture data through said output portion when the variation amount of the error is smaller than the first threshold value as the determined result of said first determining portion and when the error is smaller than the second threshold value as the determined result as said second determining portion.

8. A picture data converting method for converting first picture data into second picture data whose quality is lower than the first picture data, comprising the steps of:

generating intermediate picture data whose quality is almost the same as the second picture data with the first picture data;

storing the intermediate picture data;

generating predictive picture data whose quality is almost the same as the first picture data corresponding to the stored intermediate picture data and predictive coefficients;

detecting an error between the first picture data and the predictive picture data;

determining whether or not a variation amount of the detected error is equal to or larger than a first threshold value;

determining whether or not the detected error is equal to or larger than a second threshold value;

performing a first adjusting process for a pixel value of the stored intermediate picture data based on the first input picture data when the variation amount of the error is equal to or larger than the first threshold value;

performing a second adjusting process for the pixel value of the stored intermediate picture data with a non-linear variation amount when the variation amount of the error is smaller than the first threshold value and when the error is equal to or larger than the second threshold value; and determining the stored intermediate picture data as the second picture data when the error is smaller than the second threshold value.

9. The picture data converting method as set forth in claim 8, wherein the number of pixels of the first picture data is larger than that of the second picture data.

10. The picture data converting method as set forth in claim 8, further comprising the step of:

newly generating the predictive coefficients whenever pixel values of the intermediate picture data are adjusted.

11. The picture data converting method as set forth in claim 10, further comprising the step of:

outputting second output picture data and the predictive coefficients.

12. The picture data converting method as set forth in claim 8, wherein the second adjusting process is performed by adding or subtracting a predetermined value to/from pixel values of the stored intermediate picture data.

13. The picture data converting method as set forth in claim 12, wherein the second adjusting process is performed by adding or subtracting the predetermined value to/from each pixel value of the intermediate picture data according to the direction of the variation of the error detected at the step for decoding the error.

14. The picture data converting method as set forth in claim 8, further comprising the step of:

determining the stored intermediate picture data as said second output picture data and outputting the second output picture data when the variation amount of the error is smaller than the first threshold value and when the error is smaller than the second threshold value.

15. A data converting apparatus for converting first data into second data whose quality is lower than the first data, comprising:

an intermediate data generating portion for generating intermediate data whose quality is almost the same as the second data with the first data;

a storing portion for storing the intermediate data;

a predictive data generating portion for generating predictive data whose quality is almost the same as the first data according to the intermediate data stored in said storing portion and predictive coefficients;

an error detecting portion for detecting an error between the first data and the predictive data;

a first determining portion for determining whether or not a variation amount of the error detected by said error detecting portion is equal to or larger than a first threshold value;

a second determining portion for determining whether or not the error detected by said error detecting portion is equal to or larger than a second threshold value; and an adjusting portion for performing a first adjusting process for data values of the intermediate data stored in said storing portion based on the first input data when the variation amount of the error is equal to or larger than the first threshold value as the determined result of said first determining portion, for performing a second adjusting process for data values of the intermediate data stored in said storing portion with a non-linear variation amount when the variation amount of the error is smaller than the first threshold value as the determined result of said first determining portion and when the error is equal to or larger than the second threshold value as the determined result of said second determining portion, and for determining the intermediate data stored in said storing portion as the second data when the error is smaller than the second threshold value as the determined result of said second determining portion.

16. The data converting apparatus as set forth in claim 15, wherein the number of samples of the first data is larger than that of the second data.

17. The data converting apparatus as set forth in claim 15, further comprising:

predictive coefficients generating portion for newly generating the predictive coefficients whenever said adjusting portion adjusts data values of the intermediate data.

18. The data converting apparatus as set forth in claim 17, further comprising:

an output portion for outputting said second output data and the predictive coefficients.

19. The data converting apparatus as set forth in claim 15, wherein said adjusting portion performs the second adjusting process by adding or subtracting a predetermined value to/from data value of the intermediate data stored in said storing portion.

20. The data converting apparatus as set forth in claim 19, wherein said adjusting portion performs the second adjusting process by adding or subtracting the predetermined value to/from data value of the intermediate data according to the direction of the variation of the error detected by said error detecting portion.

21. The data converting apparatus as set forth in claim 15, wherein a plurality of data elements within a predetermined unit of the first data correlate each other.

22. A data converting method for converting first data into second data whose quality is lower than the first data, comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not a variation amount of the detected error detected is equal to or larger than a first threshold value;

determining whether or not the detected error detected is equal to or larger than a second threshold value;

performing a first adjusting process for data value of the stored intermediate data based on the first data when the variation amount of the error is equal to or larger than the first threshold value, performing a second adjusting process for data value of the stored intermediate data with a non-linear variation amount when the variation amount of the error is smaller than the first threshold value and when the error is equal to or larger than the second threshold value, and determining that the stored intermediate data is the second data when the error is smaller than the second threshold value.

23. The data converting method as set forth in claim 22, wherein the number of samples of the first data is larger than that of the second data.

24. The data converting method as set forth in claim 22, further comprising the step of:

newly generating the predictive coefficients whenever a pixel value of the intermediate data is adjusted.

25. The data converting method as set forth in claim 24, further comprising the step of:

outputting said second output data and the predictive coefficients.

26. The data converting method as set forth in claim 22, wherein the second adjusting process is performed by adding or subtracting a predetermined value to/from data value of the stored intermediate data.

27. The data converting method as set forth in claim 26, wherein the second adjusting process is performed by adding or subtracting the predetermined value to/from data value of the intermediate data according to the direction of the variation of the error detected at the step for detecting the error.

28. The data converting method as set forth in claim 22, wherein a plurality of data elements within a predetermined unit of the first data correlate each other.

29. A record medium on which a program that causes a computer to convert first picture data into second picture data whose quality is lower than the first picture data is recorded, the program comprising the steps of:

generating intermediate picture data whose quality is almost the same as the second picture data with the first picture data;

storing the intermediate picture data;

generating predictive picture data whose quality is almost the same as the first picture data according to the stored intermediate picture data and predictive coefficients;

detecting an error between the first picture data and the predictive picture data;

determining whether or not a variation amount of the detected error is equal to or larger than a first threshold value;

determining whether or not the detected error is equal to or larger than a second threshold value;

performing a first adjusting process for a pixel value of the stored intermediate picture data corresponding to the first input picture data when the variation amount of the error is equal to or larger than the first threshold value;

performing a second adjusting process for a pixel value of the stored intermediate picture data with a non-linear variation amount when the variation amount of the error is smaller than the first threshold value and when the error is equal to or larger than the second threshold value; and determining the stored intermediate picture data as the second picture data when the error is smaller than the second threshold value.

30. A record medium on which a program that causes a computer to convert first data into second data whose quality is lower than the first data is recorded, the program comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not a variation amount of the detected error is equal to or larger than a first threshold value;

determining whether or not the detected error is equal to or larger than a second threshold value;

performing a first adjusting process for data values of the stored intermediate data based on the first input data when the variation amount of the error is equal to or larger than the first threshold value, performing a second adjusting process for data value of the stored intermediate data with a non-linear variation amount when the variation amount of the error is smaller than the first threshold value and when the error is equal to or larger than the second threshold value, and determining that the stored intermediate data is the second data when the error is smaller than the second threshold value.

31. A picture data converting apparatus for converting first picture data into second picture data whose quality is lower than the first picture data, comprising:

an intermediate picture data generating portion for generating intermediate picture data whose quality is almost the same as the second picture data with the first picture data;

a storing portion for storing the intermediate picture data;

a predictive picture data generating portion for generating predictive picture data whose quality is almost the same as the first picture data according to the intermediate picture data stored in said storing portion and predictive coefficients;

an error detecting portion for detecting an error between the first picture data and the predictive picture data;

a first determining portion for determining whether or not the error detected by said error detecting portion is equal to or larger than a first threshold value and determining the intermediate picture data as the second picture data when the error is smaller than the first threshold value;

a second determining portion for determining whether or not the number of times a linear adjusting process is successively performed is equal to or larger than the second threshold value when the error is equal to or larger than the first threshold value as the determined result of said first determining portion;

a first adjusting portion for linearly adjusting pixel value of the intermediate picture data when the number of times is smaller than the second threshold value as the determined result of said second determining portion; and a second adjusting portion for non-linearly adjusting pixel value of the intermediate picture data when the number of times is equal to or larger than the second threshold value as the determined result of said second determining portion, wherein said predictive picture data generating portion generates the predictive coefficients whenever said first adjusting portion and said second adjusting portion adjust the pixel value.

32. The picture data converting apparatus as set forth in claim 31, wherein the number of pixels of the first picture data is larger than that of the second picture data.

33. The picture data converting apparatus as set forth in claim 31, further comprising:

an output portion for outputting said second output picture data and the predictive coefficients.

34. The picture data converting apparatus as set forth in claim 31, wherein said second adjusting portion adds or subtracts a predetermined value to/from pixel value of the intermediate picture data stored in said storing portion.

35. The picture data converting apparatus as set forth in claim 34, wherein said second adjusting portion adds or subtracts the predetermined value to/from pixel value of the intermediate picture data according to the direction of the variation of the error detected by said error detecting portion.

36. A picture data converting method for converting first picture data into second picture data whose quality is lower than the first picture data, comprising the steps of:

generating intermediate picture data whose quality is almost the same as the second picture data with the first picture data;

storing the intermediate picture data;

generating predictive picture data whose quality is almost the same as the first picture data corresponding to the stored intermediate picture data and predictive coefficients;

detecting an error between the first picture data and the predictive picture data;

determining whether or not the detected error is equal to or larger than a first threshold value and determining that the intermediate picture data is the second picture data when the error is smaller than the first threshold value;

determining whether or not the number of times a linear adjusting process is successively performed is equal to or larger than the second threshold value when the error is equal to or larger than the first threshold value;

linearly adjusting pixel values of the intermediate picture data when the number of times is smaller than the second threshold value; and non-linearly adjusting pixel values of the intermediate picture data when the number of times is equal to or larger than the second threshold value, wherein the predictive coefficients are generated whenever the linear adjustment and the non-linear adjustment are performed.

37. The picture data converting method as set forth in claim 36, wherein the number of pixels of the first picture data is larger than that of the second picture data.

38. The picture data converting method as set forth in claim 37, further comprising the step of:

outputting output picture data and the predictive coefficients.

39. The picture data converting method as set forth in claim 36, wherein the non-linear adjusting process is performed by adding or subtracting a predetermined value to/from pixel value of the stored intermediate picture data.

40. The picture data converting method as set forth in claim 39, wherein the non-linear adjusting process is performed by adding or subtracting the predetermined value to/from pixel value of the intermediate picture data corresponding to the direction of the variation of the error detected at the step for detecting the error.

41. A data converting apparatus for converting first data into second data whose quality is lower than the first data, comprising:

an intermediate data generating portion for generating intermediate data whose quality is almost the same as the second data with the first data;

a storing portion for storing the intermediate data;

a predictive data generating portion for generating predictive data whose quality is almost the same as the first data corresponding to the intermediate data stored in said storing portion and predictive coefficients;

an error detecting portion for detecting an error between the first data and the predictive data;

a first determining portion for determining whether or not the error detected by said error detecting portion is equal to or larger than a first threshold value and determining that the intermediate data is the second data when the error is smaller than the first threshold value;

a second determining portion for determining whether or not the number of times a linear adjusting process is successively performed is equal to or larger than the second threshold value when the error is equal to or larger than the first threshold value as the determined result of said first determining portion;

a first adjusting portion for linearly adjusting data values of the intermediate data when the number of times is smaller than the second threshold value as the determined result of said second determining portion; and a second adjusting portion for non-linearly adjusting data values of the intermediate data when the number of times is equal to or larger than the second threshold value as the determined result of said second determining portion, wherein said predictive data generating portion generates the predictive coefficients whenever said first adjusting portion or said second adjusting portion adjusts the data values.

42. The data converting apparatus as set forth in claim 41, wherein the number of samples of the first data is larger than that of the second data.

43. The data converting apparatus as set forth in claim 41, further comprising:

predictive coefficients generating portion for newly generating the predictive coefficients whenever said adjusting portion adjusts data values of the intermediate data.

44. The data converting apparatus as set forth in claim 43, further comprising:

an output portion for outputting said second output data and the predictive coefficients.

45. The data converting apparatus as set forth in claim 41, wherein said adjusting portion performs the second adjusting process by adding or subtracting a predetermined value to/from data values of the intermediate data stored in said storing portion.

46. The data converting apparatus as set forth in claim 45, wherein said adjusting portion performs the second adjusting process by adding or subtracting the predetermined value to/from data values of the intermediate data corresponding to the direction of the variation of the error detected by said error detecting portion.

47. The data converting apparatus as set forth in claim 41, wherein a plurality of data elements of a predetermined unit of the first data correlate each other.

48. A data converting method for converting first data into second data whose quality is lower than the first data, comprising the steps of:

generating intermediate data whose quality is almost the same as the second data with the first data;

a storing the intermediate data;

generating predictive data whose quality is almost the same as the first data corresponding to the stored intermediate data and predictive coefficients;

detecting an error between the first data and the predictive data determining whether or not the detected error is equal to or larger than a first threshold value and determining that the intermediate data is the second data when the error is smaller than the first threshold value;

determining whether or not the number of times a linear adjusting process is successively performed is equal to or larger than the second threshold value when the error is equal to or larger than the first threshold value;

linearly adjusting data values of the intermediate data when the number of times is smaller than the second threshold value; and non-linearly adjusting data values of the intermediate data when the number of times is equal to or larger than the second threshold value, wherein the predictive coefficients are generated whenever the linear adjustment and the non-linear adjustment are performed.

49. The data converting method as set forth in claim 48, wherein the number of samples of the first data is larger than that of the second data.

50. The data converting method as set forth in claim 49, further comprising the step of:

outputting second data and the predictive coefficients.

51. The data converting method as set forth in claim 48, wherein the non-linear adjusting process is performed by adding or subtracting a predetermined value to/from data values of the stored intermediate data.

52. The data converting method as set forth in claim 51, wherein the non-linear adjusting process is performed by adding or subtracting the predetermined value to/from data values of the intermediate data corresponding to the direction of the variation of the error detected at the step for detecting the error.

53. The data converting apparatus as set forth in claim 48, wherein a plurality of data elements of a predetermined unit of the first data correlate each other.

54. A record medium on which a program that causes a computer to convert first picture data into second picture data whose quality is lower than the first picture data is recorded, the program comprising the steps of:generating intermediate picture data whose quality is almost the same as the second picture data with the first picture data;

storing the intermediate picture data;

generating predictive picture data whose quality is almost the same as the first picture data corresponding to the stored intermediate picture data and predictive coefficients;

detecting an error between the first picture data and the predictive picture data;

determining whether or not the detected error is equal to or larger than a first threshold value and determining that the intermediate picture data is the second picture data when the error is smaller than the first threshold value;

determining whether or not the number of times a linear adjusting process is successively performed is equal to or larger than the second threshold value when the error is equal to or larger than the first threshold value;

linearly adjusting pixel values of the intermediate picture data when the number of times is smaller than the second threshold value; and non-linearly adjusting pixel values of the intermediate picture data when the number of times is equal to or larger than the second threshold value, wherein the predictive coefficients are generated whenever the linear adjustment and the non-linear adjustment are performed.

55. A record medium on which a program that causes a computer to convert first data into second data whose quality is lower than the first data is recorded, the program comprising the steps of:

generating intermediate data whose quality is almost the same as the second data with the first data;

storing the intermediate data;

generating predictive data whose quality is almost the same as the first data according to the stored intermediate data and predictive coefficients;

detecting an error between the first data and the predictive data;

determining whether or not the detected error is equal to or larger than a first threshold value and determining that the intermediate data is the second data when the error is smaller than the first threshold value;

determining whether or not the number of times a linear adjusting process is successively performed is equal to or larger than the second threshold value when the error is equal to or larger than the first threshold value;

linearly adjusting data values of the intermediate data when the number of times is smaller than the second threshold value; and non-linearly adjusting data values of the intermediate data when the number of times is equal to or larger than the second threshold value, wherein the predictive coefficients are generated whenever the linear adjustment and the nonlinear adjustment are performed.

* * * * *